United States Patent
Ghanadan et al.

(10) Patent No.: US 7,852,763 B2
(45) Date of Patent: Dec. 14, 2010

(54) SYSTEM AND METHOD FOR DETERMINING A TRANSMISSION ORDER FOR PACKETS AT A NODE IN A WIRELESS COMMUNICATION NETWORK

(75) Inventors: Reza Ghanadan, Berkeley Heights, NJ (US); John Gu, Rockaway, NJ (US); Jessica Y. Hsu, Washington, DC (US); Gregory S. Sadosuk, Fairfax, VA (US); Phong C. Khuu, Ashburn, VA (US); Brian Loop, Fairfax, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 83 days.

(21) Appl. No.: 12/387,934

(22) Filed: May 8, 2009

(65) Prior Publication Data
US 2010/0284274 A1 Nov. 11, 2010

(51) Int. Cl.
*H04L 12/24* (2006.01)
(52) U.S. Cl. .................... 370/230.1; 370/231; 370/252; 370/412
(58) Field of Classification Search ............ 370/230.1, 370/231, 252, 412
See application file for complete search history.

(56) References Cited

U.S. PATENT DOCUMENTS

| | | | |
|---|---|---|---|
| 6,430,160 B1 * | 8/2002 | Smith et al. .................. | 370/252 |
| 7,079,522 B1 | 7/2006 | Cain et al. | |
| 7,177,271 B2 * | 2/2007 | Shao et al. ................... | 370/229 |
| 7,225,271 B1 | 5/2007 | DiBiaso et al. | |
| 7,330,900 B2 | 2/2008 | Burger et al. | |
| 7,554,915 B2 * | 6/2009 | Bauer et al. .................. | 370/235 |
| 7,733,773 B2 * | 6/2010 | Wager et al. ................ | 370/230 |
| 7,787,374 B2 * | 8/2010 | Bedrosian ................ | 370/230.1 |
| 2007/0041364 A1 | 2/2007 | Kakadia | |
| 2007/0268931 A1 | 11/2007 | Shaikli | |

* cited by examiner

*Primary Examiner*—Ricky Ngo
*Assistant Examiner*—Rasheed Gidado
(74) *Attorney, Agent, or Firm*—Dilworth & Barrese, LLP; Leo G. Lenna

(57) ABSTRACT

A wireless communications network comprising a plurality of nodes and effective to provide quality of service requirements for packets being transmitted. An ingress node calculates variables based on quality of service requirements and places those variables in a header of a packet to be transmitted. The packet is then transmitted to a core node. The core node reads the variables in the packet and calculates a holding time for the packet based on the variables and the quality of service requirements.

20 Claims, 6 Drawing Sheets

SYSTEM AND METHOD FOR DETERMINING A TRANSMISSION ORDER FOR PACKETS AT A NODE IN A WIRELESS COMMUNICATION NETWORK

BACKGROUND OF THE INVENTION

1. Field of the Invention

This disclosure relates to processing of packets in wireless network communications and, more particularly, to a system and method for determining a transmission order of packets in a node in a wireless communication network while considering quality of service requirements for the packets in the network.

2. Description of the Related Art

In networked communication, two or more nodes communicate information to each other using packets of data. One type of network is a mobile ad hoc network (MANET). Referring to FIG. 1, physically, a MANET 50 may include a number of geographically distributed, potentially mobile nodes 52, 54, 58 transmitting and receiving information using one or more frequency ranges or radio channels. Compared with other types of networks, such as cellular networks or satellite networks, MANETS frequently lack fixed infrastructure. The network is formed of mobile (and potentially stationary) nodes, and may be dynamically created or modified as the nodes communicate with each other. The network does not depend on any particular node and dynamically adjusts as some nodes join or others leave the network.

In a potentially hostile environment where a fixed communication infrastructure is unreliable or unavailable, such as in a battle field or in a natural disaster area struck by earthquake or hurricane, a MANET can be quickly deployed to provide much needed communications. Due to the lack of a fixed infrastructure, nodes should self-organize and reconfigure as they move, join or leave the network. All nodes may be essentially the same, and there is no natural hierarchy or central controller in the network. All functions therefore are distributed among the nodes. Nodes are often powered by batteries and have limited communication and computation capabilities. Also, the distance between two nodes that desire to communicate may be greater than the radio transmission range of a single node, and so a transmission between a source node 52 and a destination node 54 may have to be relayed by other core nodes 58 as shown by communication line 56. Consequently, a MANET typically has a multi-hop topology, where a piece of communication "hops" from one node to another, and the topology of the network itself changes as the nodes move around, enter, or leave the network.

The network topology changes arbitrarily as the nodes move. Data information is subject to becoming obsolete if the data takes too long to reach its destination. Different nodes often have different views of the network, both in time (information may be outdated at some nodes but current at others) and in space (a node may only know the network topology in its neighborhood and not far away from itself).

Because of these unique requirements, routing data through nodes in these networks is very different than routing in other networks. Gathering fresh information about the entire network is often costly and impractical. Some routing protocols are reactive (on-demand) protocols. That is, they collect routing information only when necessary and only to destinations to which they need routes, and do not maintain unused routes. In this way the routing overhead may be reduced compared to pro-active protocols, which maintain optimal routes to all destinations at all time.

MANETs may need to satisfy certain Quality-of-Service (QoS) routing requirements. In such requirements, there is a guarantee by the network to provide data applications with sufficient network resources so that they can function within pre-specified service metrics such as network delay, delay variance or jitter, probability of packet loss, etc. For example, video and audio data applications have different QoS requirements. This disclosure describes an improvement over prior art systems.

SUMMARY OF THE INVENTION

One embodiment of the invention is a node in a wireless communications network. The node comprises an antenna; and a transmitter/receiver in communication with the antenna, the transmitter/receiver effective to transmit and receive a packet of data, the packet including a header, the packet to be transmitted to a destination in a flow. The node further comprises a scheduler in communication with the transmitter/receiver; a media access controller in communication with the scheduler. The scheduler is effective to receive the packet, set a remaining delay of flow variable equal to a maximum allowable end to end delay for a flow of the packet, set an expected delay of the packet at the node variable equal to a quotient of the remaining delay of flow variable and a number of remaining hops in the flow of the packet, set a slack variable equal to the number of remaining hops in the flow of the packet, when the expected delay of the packet at the node variable is greater than the quotient of the length of the packet and a reserved rate of flow, set a holding time equal to the expected delay of the packet at the node variable minus the quotient of the length of the packet and the reserved rate of flow; when the expected delay of the packet at the node variable is less than or equal to the quotient of the length of the packet and the reserved rate of flow, set the holding time to zero. The scheduler is further effective to forward the packet, including the expected delay of the packet at the node variable and the slack variable in the header, to the media access controller for transmission based on the holding time.

Another embodiment of the invention is a node in a wireless communications network. The node comprises an antenna; and a transmitter/receiver in communication with the antenna, the transmitter/receiver effective to transmit and receive a packet of data, the packet including a header, the packet to be transmitted to a destination in a flow. The node further comprises a scheduler in communication with the transmitter/receiver; and a media access controller in communication with the scheduler. The scheduler is effective to receive the packet including an expected delay of the packet at the node variable and a slack variable, set a remaining delay of flow variable equal to the slack variable multiplied by the expected delay of the packet at the node variable, set the expected delay of the packet at the node variable equal to a quotient of the remaining delay of flow variable and a number of remaining hops in the flow of the packet, set the slack variable equal to the number of remaining hops in the flow of the packet, when the expected delay of the packet at the node is greater than the quotient of the length of the packet and a reserved rate of flow, set a holding time equal to the expected delay of the packet at the node variable minus the quotient of the length of the packet and the reserved rate of flow, when the expected delay of the packet at the node variable is less than or equal to the quotient of the length of the packet and the reserved rate of flow, set the holding time to zero. The scheduler is further effective to forward the packet, including the expected delay of the packet at the node variable and the slack variable in the header, to the media access controller for transmission based on the holding time.

Yet another embodiment of the invention is a wireless communications network comprising a first node; and a second node. The first node comprises a first antenna; a first transmitter/receiver in communication with the first antenna, the first transmitter/receiver effective to transmit and receive a packet of data, the packet including a header, the packet to be transmitted to a destination in a flow. The first node further comprises a first scheduler in communication with the first transmitter/receiver; and a first media access controller in communication with the first scheduler. The first scheduler is effective to receive the packet, set a remaining delay of flow variable equal to a maximum allowable end to end delay for a flow of the packet, set an expected delay of the packet at the node variable equal to a quotient of the remaining delay of flow variable and a number of remaining hops in the flow of the packet, set a slack variable equal to the number of remaining hops in the flow of the packet, when the expected delay of the packet at the node variable is greater than the quotient of the length of the packet and a reserved rate of flow, set a first holding time equal to the expected delay of the packet at the node variable minus the quotient of the length of the packet and the reserved rate of flow; when the expected delay of the packet at the node variable is less than or equal to the quotient of the length of the packet and the reserved rate of flow, set the first holding time to zero. The first scheduler is further effective to forward the packet, including the expected delay of the packet at the node variable and the slack variable in the header, to the first media access controller for transmission based on the first holding time. The second node comprises a second antenna; and a second transmitter/receiver in communication with the second antenna, the second transmitter/receiver effective to receive the packet. The second node further comprises a second scheduler in communication with the second transmitter/receiver; a second media access controller in communication with the second scheduler. The second scheduler is effective to receive the packet; set the remaining delay of flow variable equal to the slack variable multiplied by the expected delay of the packet at the node variable, set the expected delay of the packet at the node variable equal to a quotient of the remaining delay of flow variable and the number of remaining hops in the flow of the packet, set the slack variable equal to the number of remaining hops in the flow of the packet, when the expected delay of the packet at the node variable is greater than the quotient of the length of the packet and a reserved rate of flow, set a second holding time equal to the expected delay of the packet at the node variable minus the quotient of the length of the packet and the reserved rate of flow, when the expected delay of the packet at the node variable is less than or equal to the quotient of the length of the packet and the reserved rate of flow, set the second holding time to zero. The second scheduler is further effective to forward the packet, including the expected delay of the packet at the node variable and the slack variable in the header, to the media access controller for transmission based on the second holding time.

Still yet another embodiment of the invention is a method for transmitting a packet of data in a wireless communication network. The method comprises at a first node including a first antenna, a first transmitter/receiver in communication with the first antenna, the first transmitter/receiver effective to transmit and receive a packet of data, the packet including a header, the packet to be transmitted to a destination in a flow, a first scheduler in communication with the first transmitter receiver, and a first media access controller in communication with the first scheduler, the first scheduler effective to perform the steps of: receiving the packet, setting a remaining delay of flow variable equal to a maximum allowable end to end delay for a flow of the packet, setting an expected delay of the packet at the node variable equal to a quotient of the remaining delay of flow variable and a number of remaining hops in the flow of the packet, setting a slack variable equal to the number of remaining hops in the flow of the packet, when the expected delay of the packet at the node variable is greater than the quotient of the length of the packet and a reserved rate of flow, setting a first holding time equal to the expected delay of the packet at the node variable minus the quotient of the length of the packet and the reserved rate of flow, when the expected delay of the packet at the node variable is less than or equal to the quotient of the length of the packet and the reserved rate of flow, setting the first holding time to zero, and forwarding the packet, including the expected delay of the packet at the node variable and the slack variable in the header, to the first media access controller for transmission based on the first holding time. The method further includes at a second node including a second antenna, a second transmitter/receiver in communication with the second antenna, the second transmitter/receiver effective to receive the packet, a second scheduler in communication with the second transmitter/receiver, and a second media access controller in communication with the second scheduler, the second scheduler effective to perform the steps of: receiving the packet, setting the remaining delay of flow variable equal to the slack variable multiplied by the expected delay of the packet at the node variable, setting the expected delay of the packet at the node variable equal to a quotient of the remaining delay of flow variable and the number of remaining hops in the flow of the packet, setting the slack variable equal to the number of remaining hops in the flow of the packet, when the expected delay of the packet at the node variable is greater than the quotient of the length of the packet and a reserved rate of flow, setting a second holding time equal to the expected delay of the packet at the node variable minus the quotient of the length of the packet and the reserved rate of flow, when the expected delay of the packet at the node variable is less than or equal to the quotient of the length of the packet and the reserved rate of flow, setting the second holding time to zero, and forwarding the packet, including the expected delay of the packet at the node variable and the slack variable in the header, to the media access controller for transmission based on the second holding time.

BRIEF DESCRIPTION OF THE DRAWINGS

The drawings constitute a part of the specification and include exemplary embodiments of the present invention and illustrate various objects and features thereof.

DETAILED DESCRIPTION OF THE PREFERRED EMBODIMENT(S)

Figure 1:
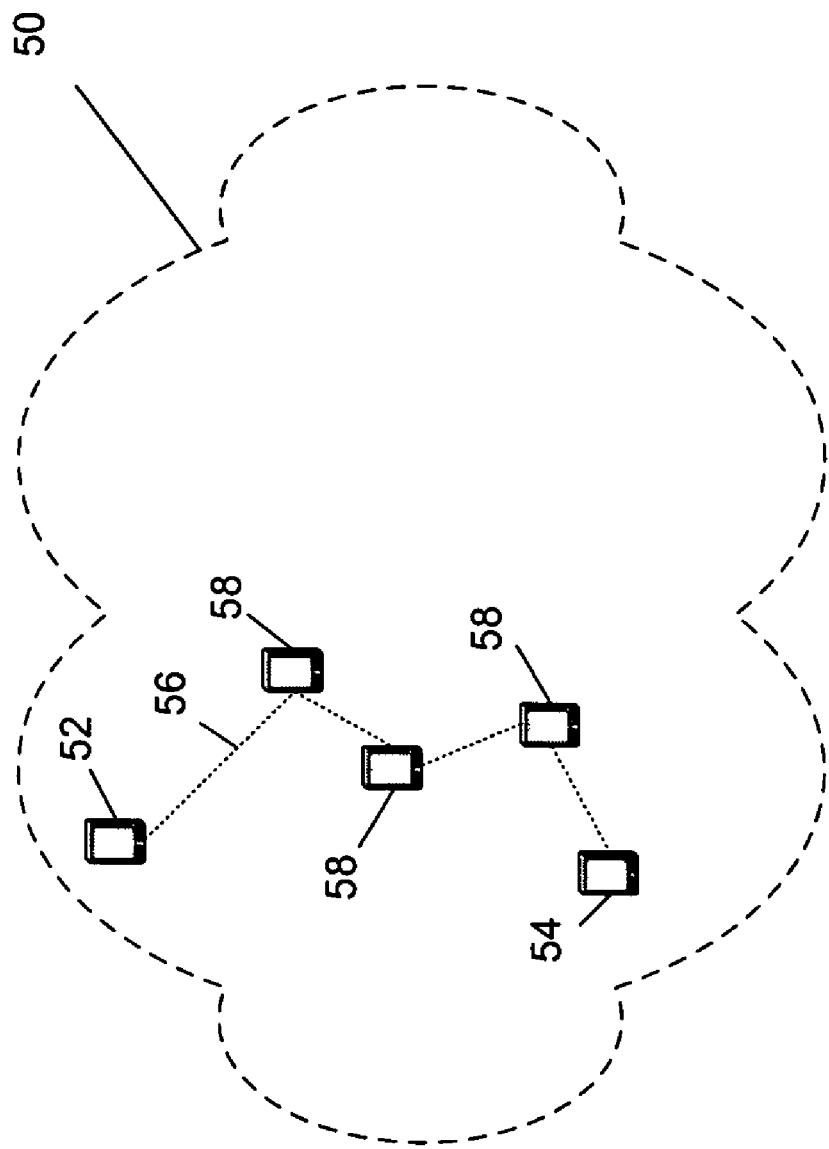
FIG. 1 is a system diagram of a wireless communication network in accordance with the prior art.

Various embodiments of the invention are described hereinafter with reference to the figures. Elements of like structures or function are represented with like reference numerals throughout the figures. The figures are only intended to facilitate the description of the invention or as a limitation on the scope of the invention. In addition, an aspect described in conjunction with a particular embodiment of the invention is not necessarily limited to that embodiment and can be practiced in conjunction with any other embodiments of the invention.

Figure 2:
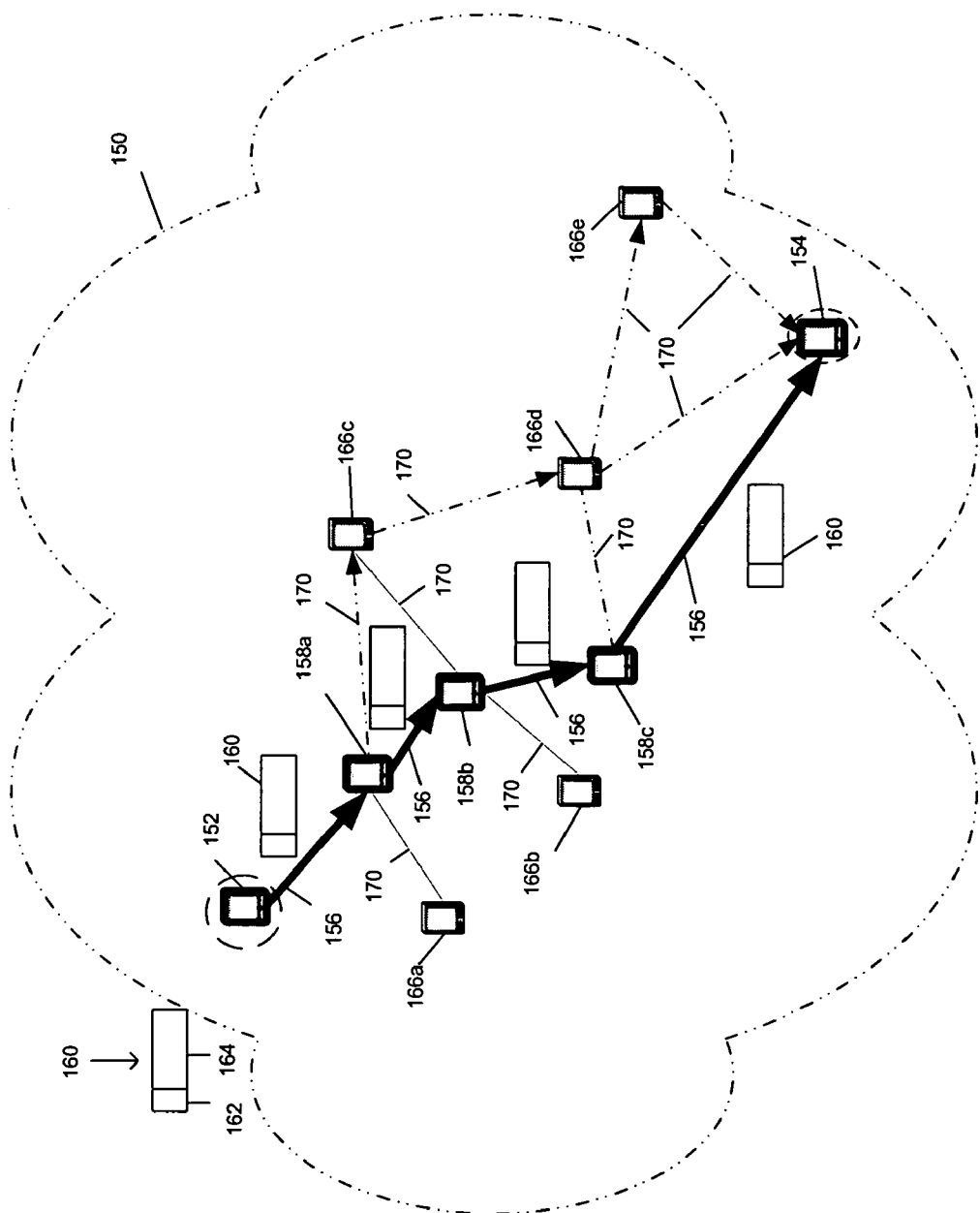
FIG. 2 is a system diagram of a wireless communication network in accordance with an embodiment of the invention.

Referring to FIG. 2, there is shown a wireless communication network 150 in accordance with an embodiment of the invention. Network 150 may used to facilitate transmission of a data packet 160 from a source or ingress node 152 (circled to emphasize) to a destination or egress node 154 (also circled) through core or intermediate nodes 158 using a flow or path 156 (shown in dark lines with arrows). Also shown are alternate nodes 166 connected by alternate paths 170 for use when core nodes 158 do not provide needed service or when a topology of network 150 changes. Network 150 could be a Mobile Area Ad Hoc network (MANET).

In order to handle QoS requirements, including for example those suggested by the "Joint Airborne Network Services Suits Standards Definition Document", Draft Version 1.1 Jun. 30, 2006, a MANET should be able to provide differential treatment of traffic flows based on traffic type and prioritization. This may include support of the DISA GIG (defense information systems agency global information grid) common services classes where a service class is a grouping of applications with similar characteristics and performance requirements. These service classes may be treated in the same way across the network. Different service classes may have different QoS metrics and expectations from the network nodes. A service level agreement (SLA) may be defined for each service class to ensure end to end QoS.

To accomplish the above QoS, intra-nodal and inter-nodal traffic management may be used. Inter-nodal traffic management includes ordering of data frames bearing different level of priority and guaranteeing that network nodes may gain access to a pertinent radio frequency channel. Intra-nodal QoS includes hierarchical queuing and scheduling. The hierarchical queuing provides priority based scheduling for control data and rate based scheduling for user data.

Quality of service in network 150 is implemented, in part, using a dynamic scheduling state arrangement. As shown in FIG. 2, each packet 160 includes a header 162 and a body 164. Body 164 includes information being sent in packet 160. Header 162 includes state scheduling information. The state scheduling information may be generated by the source or ingress node 152 and may be based on the DSCP (differential service code point) setting and locally stored traffic contracts for the type of data being transmitted including agreements on rate, delay, delay jitter, packet loss rate, etc. Core nodes 158 process each packet 160 based on scheduling information in the packet's header 162 and update header 162 as needed (such as based on latest topology arrangements and network traffic conditions) before forwarding packet 160 to the next node in path 156. The egress node 154 removes header 162 and the original DSCP setting is available for subsequent nodes. If packets are received outside a required performance envelope, egress node 154 can identify this phenomena and generate a notification so that network 150 can make appropriate adaptation.

The ability to update a packet's scheduling state information and carry this state information across network 150 allows each node in path 156 to coordinate and prioritize the transmission ordering of the packet to ensure performance compliance with service level agreements. The dynamic scheduling state also allows core nodes to adapt to changing environments in network 150.

For example, assume that ingress node 152 is to send packet 160 to egress node 154 through core nodes 158 and the end to end delay for traffic is 100 ms based on a service level agreement for the type of packet 160. As there are four hops to the destination egress node 154, each node may assume it can hold packet 160 for at most 25 ms if needed. Assume that packet 160 been sent to core node 158a, and that nodes 152 and 158a held on the packet for 25 ms so that the remaining acceptable delay is 50 ms. However, as packet 160 arrives at node 158b, the path in the MANET changes to include alternate path 170 and alternate nodes 166d and 166e to arrive at egress node 154. There are now 4 remaining hops to the destination instead of 2 as originally calculated. Each core node would now need to reduce the maximum holding time to about 12.5 ms in order for packet 160 to make it to egress node 154 within the 100 ms requirement. The discussed dynamic scheduling packet state can be used to achieve this goal.

To encode dynamic scheduling states, a floating point like representation may be used. In this format, with m bits for mantissa and n for exponent, any integer in the range $[0 \ldots 2^{m+1}-1) \times (2^{2^n-1})]$ may be represented by $(-1/2^{m+1}, 1/2^{m+1})$. A pseudo code for converting between integers and floating point is shown below:

```
integer to float:
    nbits:= bits of the state value;
    if (nbits <= m) then
        mantissa := val;
        exponent := (1<<n) - 1;
    else
        exponent := nbits - m - 1;
        mantissa := (val >> exponent) - (1<<m)
    end if
float to integer:
    if (exponent = (1<<n) -1) then
        integer :=mantissa;
    else
        integer := (mantissa | (1<<m))<<exponent;
    end if.
```

The information may be further rounded by computing upper and lower limits of the original state value and then choosing the value closest to the original state value as the encoded state value.

An example of a ten octet header 162 which may be used in accordance with the invention is shown below.

| Octet 1 | Octet 2 | Octet 3 | Octet 4 | Octet 5 | Octet 6 | Octet 7 | Octet 8 |
|---|---|---|---|---|---|---|---|
| DMAC | | | | | | | |
| DMAC Cont. | | | | | QoS Service Ind. | QoS Slack | |
| SMAC | | | | | | | |
| SMAC (cont.) | | | | | QoS Slack (cont.) | | |
| Type | | | | PLI | | | |
| PLI (cont.) | | | | | | | |
| SAR Ind. | | ARQ | | FS | | | |
| FS (cont.) | | | | | | | |
| TTL | | | | | QoS Delay | | |
| QoS Delay (cont.) | QoS DSCP | | | | | | |

The MAC address is the unique media access control address assigned to each node. SMAC is the address of the source or ingress node and DMAC is the address of the destination or egress node. The source node can thus be easily identified by comparing the SMAC value with the MAC address of a current node. Similarly, the destination node can be identified by comparing the DMAC address with the MAC address of a current node. The current node is a core node if neither the SMAC or the DMAC values match the MAC address of the current node. The 1 bit QoS service indicator may be used to indicate whether the current packet flow needs delay guarantee or bandwidth guarantee. For example, a value of 1 may be a delay guarantee and 0 may be a bandwidth guarantee. This indicator may be ignored if the DSCP value is all 0s which indicates the current flow is best effort. "QoS Slack" is a variable used by scheduling algorithms as discussed below. "Type" is the type of data to be transmitted. "PLI" is a packet length indicator. "SAR" is segmentation and reassembly. "ARQ" is automatic repeat request. "FS" is a fragmentation header. "TTL" is time to live.

A queue ID for a path of the packet may be generated from the SMAC (13 bits), the DMAC (13 bits) and the DSCP (6 bits). As 8 service classes may be supported, 8 class based queues may be used. For example, to ensure interoperability with GIG, the following service classes may be defined: 1) network control & signaling (CS6) 2) user signaling, circuit emulation, short messages, voice (CS5) 3) video (CS4) 4) streaming (CS3) 5) interactive transaction, OAM (CS2) 6) file transfer (high throughput data) (CS1) 7) default (best effort) CS0 8) scavenger (CS1).

For flow based queuing, a minimum of 1024 flow based queues may be supported. Rather than allocating space for each queue, the queue may be shared using a linked list scheme. The packets belonging to a group or class may be grouped together to form a per flow or class queuing structure. The blocks within a packet may be linked and the heads of frames linked to allow easy manipulation at the frame level. For example, in a class based queue, a block in a start of a packet may point to a middle of packet block, which in turn may point to another middle of packet block, which may point to a second to last block of a packet, which may point to a block in the end of the packet.

Figure 3:
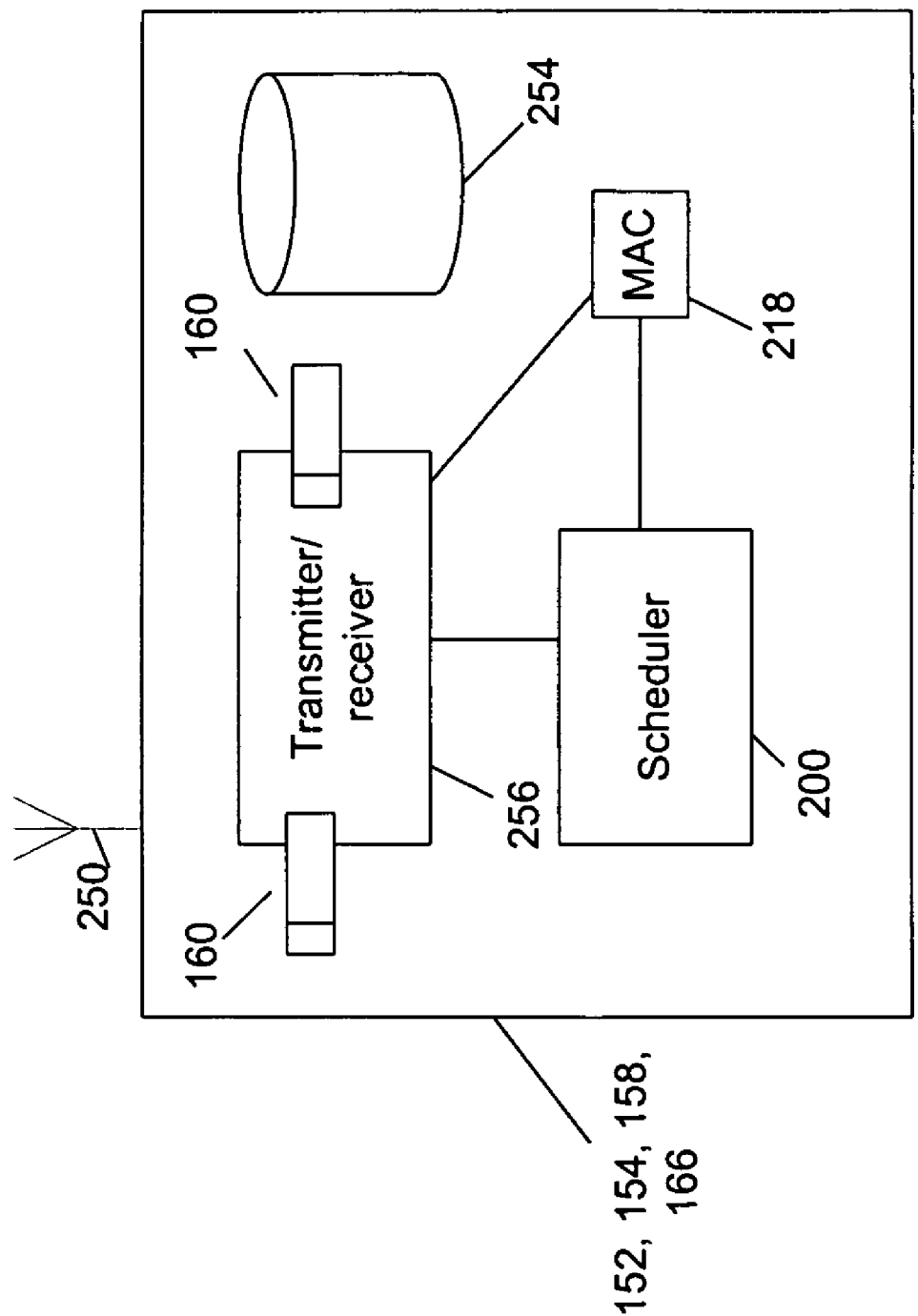
FIG. 3 is a circuit diagram of a node in a wireless communication network in accordance with an embodiment of the invention.

A more detailed view of each node 152, 154, 158, 166 is shown in FIG. 3. Each node 152, 154, 158, 166 includes an antenna 250 in communication with a transmitter/receiver 256. As shown, packets 160 may be received by and transmitted from transmitter/receiver 256. Reception of packet 160 may come from antenna 250 in a core node and from a data generation source (not shown) in a source node. A scheduler 200 is in communication with the transmitter/receiver 256 and is used to process packets 160 and forward packets 160 to a media access controller 218 based on scheduling algorithms as discussed below. A memory 254 may be used to store information.

Figure 4:
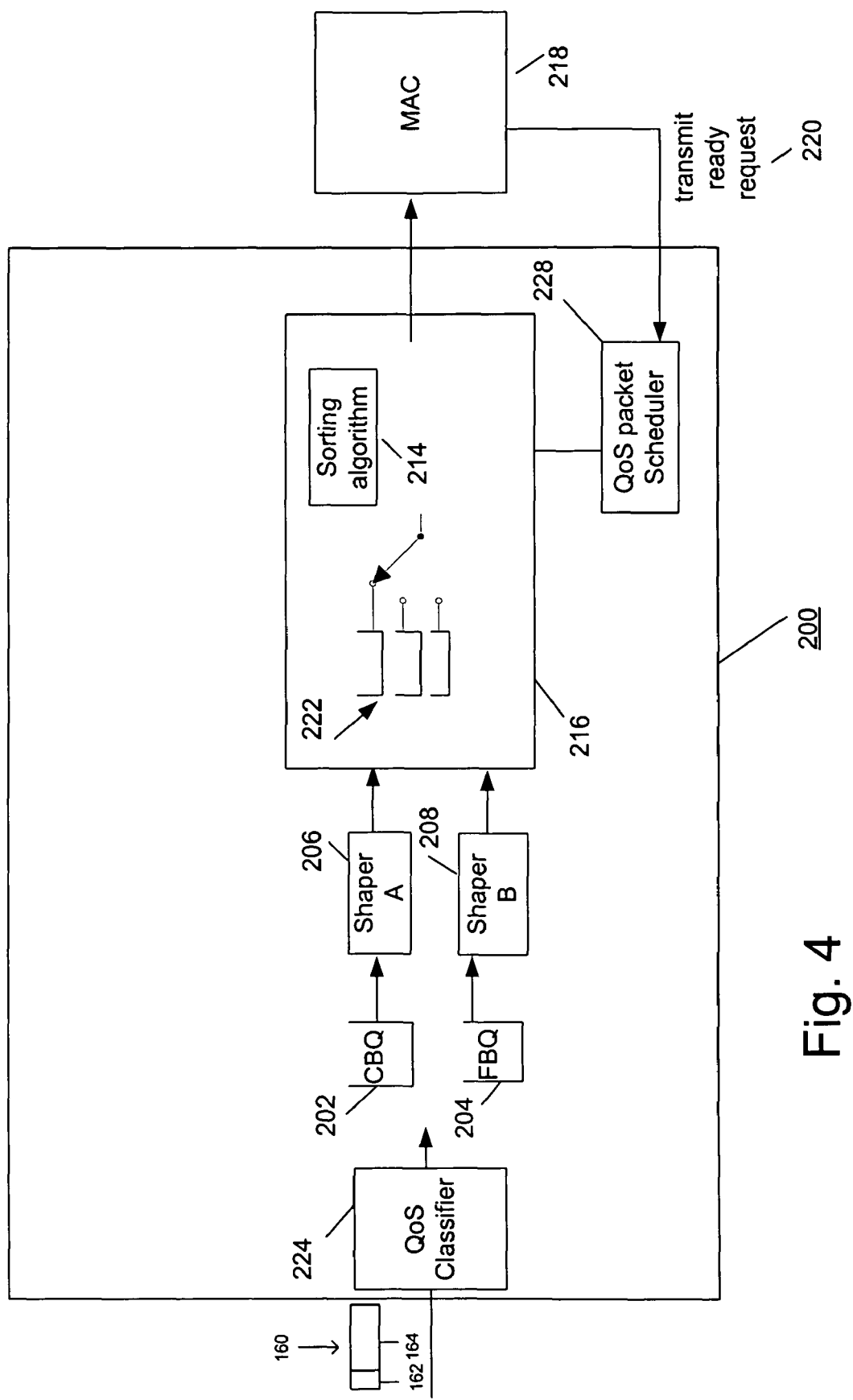
FIG. 4 is a circuit diagram of a scheduler in accordance with an embodiment of the invention.

Scheduler 200 is shown in more detail in FIG. 4. Scheduler 200 includes a classifier 224 effective to receive packets 160 and classify the service type of packets 160. If scheduler 200 is in a source node, classifier 224 generates a service type based on the type of data in body 164 and QoS requirements/contracts and stores the classification in header 162 (e.g. CS1-CS6). If scheduler 200 is in a core node, classifier 224 reads the service type stored in header 162. As discussed above, the octet in header 162 includes the service type. Classifier 224 places packet 160 in an appropriate queue 202, 204 based on the service types. Shapers 206, 208 receive packets from queues 204, 204 and are used to shape a transmission of packets 160 according to a traffic contract of the flow/service type. Two shapers 206, 208 are shown for two types of queues, a CBQ (class based queue) 202 and a FBQ (flow based queue) 204. Different algorithms may be used to control the time of transmission of the packets in each queue. For example, as discussed in detail below, if a packet arrives at scheduler 200 earlier than its theoretical eligibility time for transmission, shaper 206, 208 may delay transmission of the packet. If a packet arrives later than its theoretical eligibility time, the packet's eligibility time is set to the current time and placed in the eligible transmission queue of a media access controller (MAC) 218 so that the packet may receive transmission service as early as possible. A sorter 216 (discussed in more detail below) selects a packet in the eligible transmission queue for transmission by MAC 218.

Shapers 206, 208 use algorithms described in more detail below to shape the data output at a particular rate, and to control latency and sharing of bandwidth among different flows and service class types. A shaped packet that has been processed by shapers 206, 208 is eligible to be transmitted and placed in eligible transmission queue 222 to await selection by sorter 216 for transmission by MAC 218 based on a sorting algorithm.

Traffic Contract

The flow/service class traffic contract is maintained in a traffic contract table in memory 254. For example, 64 contracts may be defined to flows/service classes. Shown below is an example of parameters of an entry in a Traffic Control Table:

TrafficContractID {integer value}
Shaping {yes,no}
Peak rate {bits per second}
Sustained rate {bits per second}
Burst size {bits per second}
Minimum rate {bits per second}
Delay {milliseconds}
Delay variation {milliseconds}

Shaper 206, 208 (FIG. 4) may be used for each traffic contract. Each class based queue (CBQ) and flow based queue (FBQ) is assigned a contract and corresponding shaper. Multiple flows may share a contract but may need their own respective shapers.

Shapers

Scheduling algorithms are defined for shapers 206, 208 depending on whether a flow with bandwidth guarantee or a flow with delay guarantee is used for the class/service type. The following variables are relevant for those scheduling algorithms.

| Notation | Description |
|---|---|
| $p_{ki}$ | the kth packet of flow i |
| $l_{ki}$ | length of $P_{ki}$ |
| $r_i$ | reserved rate of flow i |
| $at_{ki,j}$ | arrival time of $p_{ki}$ at node j |
| $h_{ki,j}$ | Holding time of $p_{ki}$ at node j |
| $\delta_{ki,j}$ | Slack variable of $p_{ki}$ at node j |
| $dt_{ki,j}$ | Deadline of $p_{ki}$ at node j |
| $r_{di}$ | remaining delay of flow i |
| $rh_{i,j}$ | number of remaining hops of flow i at node j until the destination node as calculated by AHDR |
| $ed_{i,j}$ | expected delay of $p_{ki}$ at node j, encoded in the header |

Flow with Bandwidth Guarantee

To generate a flow with a bandwidth guarantee, for a particular packet Pki, the particular packet's deadline $dt_{kij}$ and holding time $h_{kij}$ at the $j^{th}$ node may be computed by shaper 206, 208 using the following pseudo code:

```
if k = 1 then
    dt_{1i,j} := at_{1i,j} and h_{1i,j} := 0
else
    if p_{ki} is at an ingress node, then
        dt_{ki,j} := max (at_{ki,j}, dt_{k-1i,j} + (l_{k-1i}/r_i))
        if (dki,j > aki,j) then
            h_{ki,j} := dki,j − dt_{k-1i,j}
        else
            h_{ki,j} := 0
        end if
    else
        dt_{ki,j} := at_{ki,j} + h_{ki,j}
    end if
end procedure
```

At each node in the source to destination transmission path, the deadline for the first packet (k=1) of every flow is assigned to the arrival time of the packet.

At ingress nodes 152, a packet's holding time $h_{kij}$ is computed as the difference between deadlines of current and previous packets. The holding time $h_{kij}$ is placed in header 162 for use by core nodes 158.

At each core node 158, holding time $h_{kij}$ is retrieved from packet header 162 and used to compute a deadline $dt_{kij}$ for the particular packet which is the packet arrival time $at_{kij}$+holding time $h_{kij}$. No per-flow state needs to be maintained at any core node and the packet with the earliest deadline gets transmission service at each node.

Flow with Delay Guarantee

To generate a flow with a delay guarantee, for a packet $P_{ki}$, its deadline $dt_{kij}$, holding time $h_{kij}$, slack $\delta_{kij}$, remaining delay $rd_i$, and expected delay $ed_{ij}$ at the $j^{th}$ node can be computed using the following pseudo code:

```
begin procedure
if k=1 then
    dt_{1i,j} := at_{1i,j} and h_{1i,j} := 0
else
    if p_{ki} is at an ingress node then
        rd_i := maximum end to end delay allowed for flow i
        ed_{i,j} := rd_i/rh_{i,j}
        δ_{ki,j} := rh_{i,j}
    else if p_{ki} is at a core node 158 then
        rd_i := δ_{i,j-1} * ed_{i,j}
        ed_{i,j} := rd_i/rh_{i,j}
        δ_{ki,j} := rh_{i,j}
    end if
    if (ed_{i,j} > l_{ki}/r_i) then
        h_{ki,ji} := ed_{i,j} − l_{ki}/r_i
    else
        hki,j := 0
    end if
    dt_{ki,j} := at_{ki,j} + h_{ki,j}
end if
end procedure
``` where $r_i$ is (2*peak data rate*sustained data rate of input traffic)/(peak data rate+sustained data rate).

At each node in the source to destination transmission path, the deadline for the first packet (k=1) of every flow is assigned its arrival time.

At an ingress node, any flow i is assigned to a maximum remaining end to end delay threshold $rd_i$ based on the type of the packet. The slack variable $\delta k_{ij}$ is defined as the remaining hops $rh_{ij}$ on the transmission path—which can be retrieved from the AHDR (adaptive hybrid domain routing) layer. An expected delay $ed_{ij}$ at the current hop is defined as $rd_i/rh_{ij}$. The expected holding time $h_{kij}$ for the packet to meet delay requirements at the current hop is $ed_{ij}-lk_i/r_i$. The deadline for the non-first packet $dt_{kij}$ is computed as packet arrival time $at_{kij}$ plus holding time $h_{kij}$. The state variables $\delta_{kij}$ and $ed_{ij}$ are placed into frame header 162 before the packet 160 is transmitted to the next node.

At core nodes, the state variables of slack $\delta_{kij}$ and expected delay $ed_{ij}$ are read from frame header 162. The remaining delay carried from the previous hop $rd_i$ is computed as $\delta_{kij}*ed_{ij}$. The state variables $\delta_{kij}$ $ed_{ij}$ are then updated and placed into header 162 at the particular core node. The deadline for transmission $dt_{kij}$ is also computed as discussed above for the ingress node. Then the state variables are placed into frame header 162 before the packet is transmitted to the next node.

Figure 5:
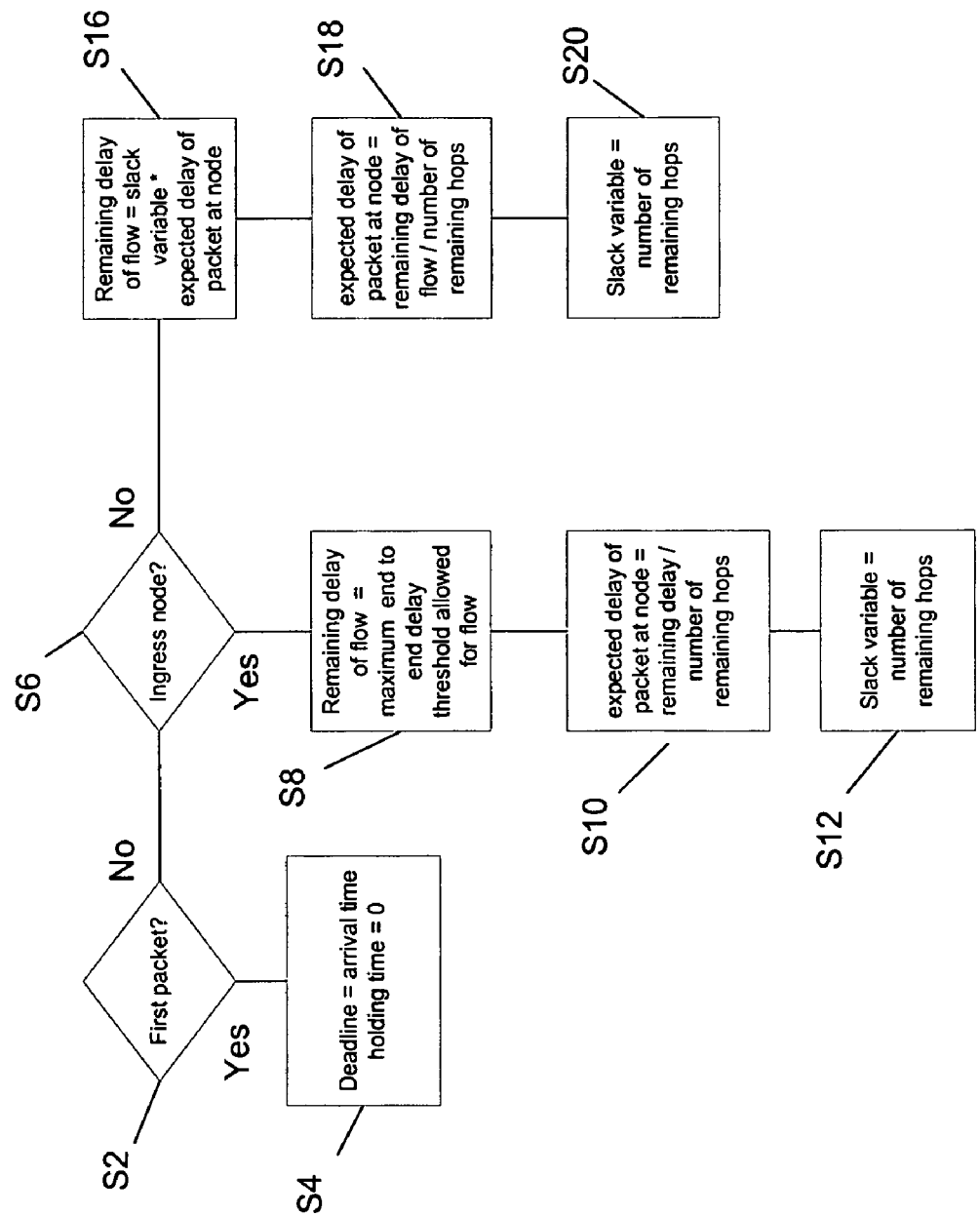
FIG. 5 is a flow chart of a process which could be performed in accordance with an embodiment of the invention.
Figure 6:
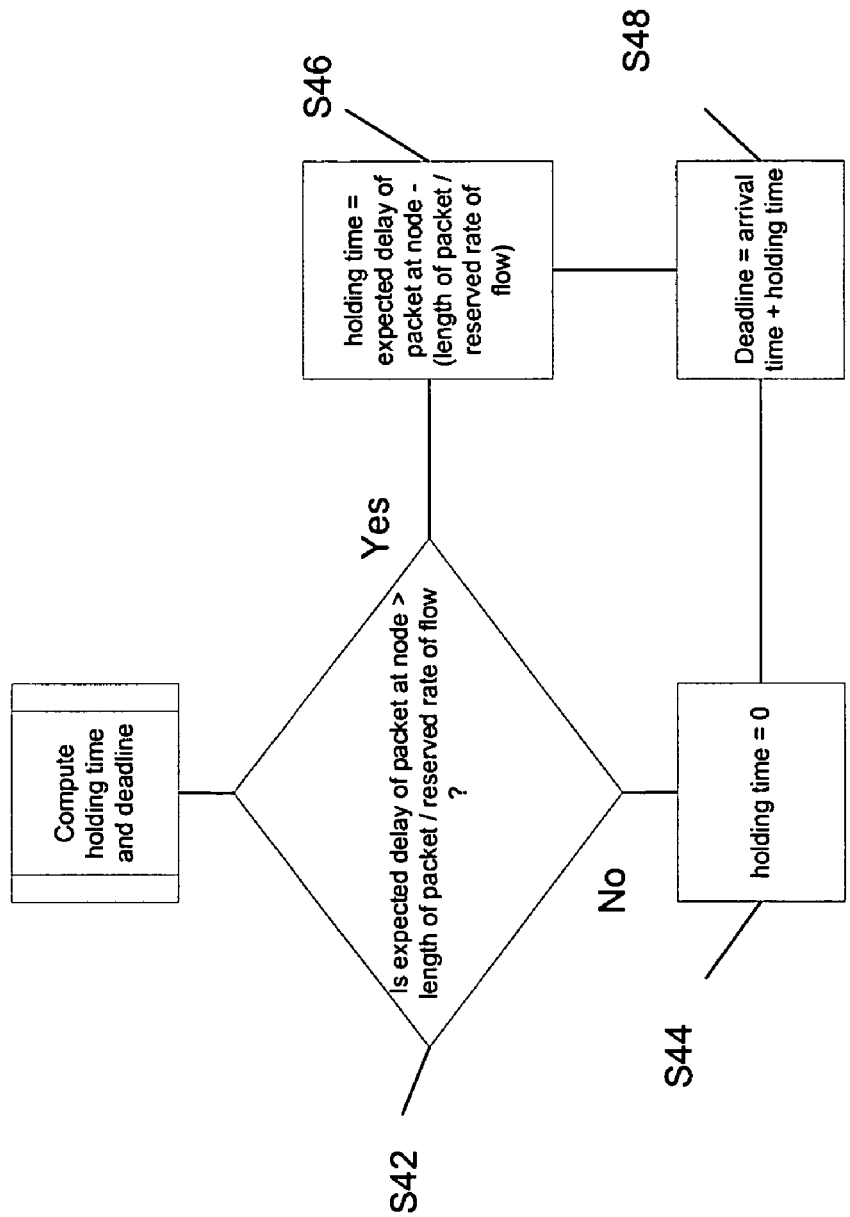
FIG. 6 is a flow chart of a process which could be performed in accordance with an embodiment of the invention.

Referring to FIGS. 5 and 6, there is shown a summary of the process which could be performed by a node when handling flow with delay guarantee. The processes could be performed, for example, by shapers 206, 208. As shown, at step S2, a query is made to see if the packet being assigned transmission is a first packet. If the packet is the first packet, at step S4 the transmission deadline is set equal to the arrival time, and the holding time is set to 0. If the packet is not the first packet, control branches to step S6, where a query is made see to whether the node is an ingress node. If the node is an ingress node, control branches to step S8 where the remaining delay of the packet flow is set equal to a maximum allowable end to end delay threshold for the flow. Control continues to step S10 where an expected delay for the packet at the node is set equal to the remaining delay of the flow divided by the number of remaining hops. At step S12, a slack variable is set equal to the number of remaining hops.

If the node is not an ingress node at step S6, the process continues for core nodes at step S16. At step S16, the remaining delay of flow at the node is set equal to the slack variable multiplied by the expected delay of the packet at the node. At step S18, the expected delay of the packet at the node is set equal to the remaining delay of the flow divided by the number of remaining hops. At step S20, the slack variable is set equal to the number of remaining hops.

Referring to FIG. 6, every node computes the holding time and deadline for packet transmission from the node. At step S42, a query is made asking whether the expected delay of a packet at the node is greater than the length of the packet divided by the reserved rate of the flow. If the answer to the query S42 is no, the holding time is set equal to 0. If the answer to query S42 is yes, the holding time is set equal to the expected delay of the packet at the node minus the quotient of the length of the packet and the reserved rate of the flow at step S46. Control after either step S44 or step S46 branches to step S48 where the deadline for transmission of the packet is set equal to the arrival time+the holding time.

Sorter Operation

Sorter 216 selects a packet from eligible transmission queue 222 (placed there after being shaped by shapers 206, 208) for transmission by MAC 218 based on a number of sorting techniques. Examples include:

First in first out (FIFO)—this scheme does not require flow state information.

Round robin—this could use some flow state information to choose a queue but can then arbitrate without further state information.

Earliest finish time first (EFTF)—which calculates the finish time and selects from all eligible flows the one with the smallest finish time.

Strict priority—certain defined flows always get priority.

For the FIFO, sorter 216 may include three eligible transmission queues 222 in decreasing order of transmission precedence: 1) a control queue 2) a best effort queue and 3) a non-best effort queue. Non-best effort packets may be placed in the non-best effort queue and best effort packets may be placed in the best effort queue. When a transmission ready request 220 is received from MAC 218 by QoS scheduler 228, QoS scheduler 228 instructs sorter 216 to select the most eligible packet by arbitrating among packets at the front of queues 222 where the packet from the queue with the highest precedence is transmitted first.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A node in a wireless communications network, the node comprising:
    an antenna;
    a transmitter/receiver in communication with the antenna, the transmitter/receiver effective to transmit and receive a packet of data, the packet including a header, the packet to be transmitted to a destination in a flow;
    a scheduler in communication with the transmitter/receiver;
    a media access controller in communication with the scheduler;
    the scheduler effective to
        receive the packet,
        set a remaining delay of flow variable equal to a maximum allowable end to end delay for a flow of the packet,
        set an expected delay of the packet at the node variable equal to a quotient of the remaining delay of flow variable and a number of remaining hops in the flow of the
    packet,
        set a slack variable equal to the number of remaining hops in the flow of the packet,
        when the expected delay of the packet at the node variable is greater than the quotient of the length of the packet and a reserved rate of flow, set a holding time equal to the expected delay of the packet at the node variable minus the quotient of the length of the packet and the reserved rate of flow;
        when the expected delay of the packet at the node variable is less than or equal to the quotient of the length of the packet and the reserved rate of flow, set the holding time to zero, and the scheduler is further effective to forward the packet, including the expected delay of the packet at the node variable and the slack variable in the header, to the media access controller for transmission based on the holding time.

2. The node as recited in claim 1, wherein a deadline for transmitting the packet is equal to an arrival time of the packet at the node plus the holding time.

3. The node as recited in claim 1, wherein the scheduler further comprises:
    a classifier effective to receive the packet and send the packet to a queue based on a type of the packet;
    a shaper effective to receive the packet from the queue and to set the holding time; and
    a sorter effective to forward the packet to the media access controller after the holding time and based on a sorting algorithm.

4. The node as recited in claim 3, wherein the sorting algorithm is one of first in first out, round robin, earliest finish time first, and strict priority.

5. The node as recited in claim 1, where the reserved rate of flow is equal to two times a peak data rate times a sustained data rate divided by the sum of the peak data rate and the sustained data rate.

6. A node in a wireless communications network, the node comprising:
    an antenna;
    a transmitter/receiver in communication with the antenna, the transmitter/receiver effective to transmit and receive a packet of data, the packet including a header, the packet to be transmitted to a destination in a flow;
    a scheduler in communication with the transmitter/receiver;
    a media access controller in communication with the scheduler;
    the scheduler effective to
        receive the packet including an expected delay of the packet at the node variable and a slack variable,
        set a remaining delay of flow variable equal to the slack variable multiplied by the expected delay of the packet at the node variable,
        set the expected delay of the packet at the node variable equal to a quotient of the remaining delay of flow variable and a number of remaining hops in the flow of the packet,
        set the slack variable equal to the number of remaining hops in the flow of the
    packet,
        when the expected delay of the packet at the node is greater than the quotient of the length of the packet and a reserved rate of flow, set a holding time equal to the expected delay of the packet at the node variable minus the quotient of the length of the packet and the reserved rate of flow,
        when the expected delay of the packet at the node variable is less than or equal to the quotient of the length of the packet and the reserved rate of flow, set the holding time to zero, and
    the scheduler is further effective to forward the packet, including the expected delay of the packet at the node variable and the slack variable in the header, to the media access controller for transmission based on the holding time.

7. The node as recited in claim 6, wherein a deadline for transmitting the packet is equal to an arrival time of the packet at the node plus the holding time.

8. The node as recited in claim 6, wherein the scheduler further comprises:
- a classifier effective to receive the packet and send the packet to a queue based on a type of the packet;
- a shaper effective to receive the packet from the queue and to set the holding time; and
- a sorter effective to forward the packet to the media access controller after the holding time and based on a sorting algorithm.

9. The node as recited in claim 8, wherein the sorting algorithm is one of first in first out, round robin, earliest finish time first, and strict priority.

10. The node as recited in claim 6, where the reserved rate of flow is equal to two times a peak data rate times a sustained data rate divided by the sum of the peak data rate and the sustained data rate.

11. A wireless communications network comprising:
a first node; and
a second node;
the first node comprising:
- a first antenna;
- a first transmitter/receiver in communication with the first antenna, the first transmitter/receiver effective to transmit and receive a packet of data, the packet including a header, the packet to be transmitted to a destination in a flow;
- a first scheduler in communication with the first transmitter/receiver;
- a first media access controller in communication with the first scheduler;
the first scheduler effective to
  - receive the packet,
  - set a remaining delay of flow variable equal to a maximum allowable end to end delay for a flow of the packet,
  - set an expected delay of the packet at the node variable equal to a quotient of the remaining delay of flow variable and a number of remaining hops in the flow of the packet,
  - set a slack variable equal to the number of remaining hops in the flow of the packet,
  - when the expected delay of the packet at the node variable is greater than the quotient of the length of the packet and a reserved rate of flow, set a first holding time equal to the expected delay of the packet at the node variable minus the quotient of the length of the packet and the reserved rate of flow;
  - when the expected delay of the packet at the node variable is less than or equal to the quotient of the length of the packet and the reserved rate of flow, set the first holding time to zero, and
  - the first scheduler is further effective to forward the packet, including the expected delay of the packet at the node variable and the slack variable in the header, to the first media access controller for transmission based on the first holding time;
the second node comprising:
- a second antenna;
- a second transmitter/receiver in communication with the second antenna,
- the second transmitter/receiver effective to receive the packet;
- a second scheduler in communication with the second transmitter/receiver;
- a second media access controller in communication with the second scheduler;
the second scheduler effective to
  - receive the packet;
  - set the remaining delay of flow variable equal to the slack variable multiplied by the expected delay of the packet at the node variable,
  - set the expected delay of the packet at the node variable equal to a quotient of the remaining delay of flow variable and the number of remaining hops in the flow of the packet,
  - set the slack variable equal to the number of remaining hops in the flow of the packet,
  - when the expected delay of the packet at the node variable is greater than the quotient of the length of the packet and a reserved rate of flow, set a second holding time equal to the expected delay of the packet at the node variable minus the quotient of the length of the packet and the reserved rate of flow,
  - when the expected delay of the packet at the node variable is less than or equal to the quotient of the length of the packet and the reserved rate of flow, set the second holding time to zero, and
  - the second scheduler further effective to forward the packet, including the expected delay of the packet at the node variable and the slack variable in the header, to the media access controller for transmission based on the second holding time.

12. The communications network as recited in claim 11, wherein:
- a first deadline for transmitting the packet is equal to a first arrival time of the packet at the first node plus the first holding time; and
- a second deadline for transmitting the packet is equal to a second arrival time of the packet at the second node plus the second holding time.

13. The communications network as recited in claim 11, wherein:
the first scheduler further comprises:
- a first classifier effective to receive the packet and send the packet to a first queue based on a type of the packet;
- a first shaper effective to receive the packet from the first queue and to set the first holding time; and
- a first sorter effective to forward the packet to the first media access controller after the first holding time and based on a first sorting algorithm; the second scheduler further comprises:
- a second classifier effective to receive the packet and send the packet to a second queue based on the type of the packet;
- a second shaper effective to receive the packet from the second queue and to set the second holding time; and
- a second sorter effective to forward the packet to the second media access controller after the second holding time and based on a second sorting algorithm.

14. The communications network as recited in claim 13, wherein the first and second sorting algorithms are each one of first in first out, round robin, earliest finish time first, and strict priority.

15. The communications network as recited in claim 11, where the reserved rate of flow is equal to two times a peak data rate times a sustained data rate divided by the sum of the peak data rate and the sustained data rate.

16. A method for transmitting a packet of data in a wireless communication network, the method comprising:
at a first node including
a first antenna,
a first transmitter/receiver in communication with the first antenna, the first transmitter/receiver effective to transmit and receive a packet of data, the packet including a header, the packet to be transmitted to a destination in a flow,
a first scheduler in communication with the first transmitter receiver, and
a first media access controller in communication with the first
scheduler, the first scheduler effective to perform the steps of:
receiving the packet,
setting a remaining delay of flow variable equal to a maximum allowable end to end delay for a flow of the packet,
setting an expected delay of the packet at the node variable equal to a quotient of the remaining delay of flow variable and a number of remaining hops in the flow of the packet,
setting a slack variable equal to the number of remaining hops in the flow of the packet,
when the expected delay of the packet at the node variable is greater than the quotient of the length of the packet and a reserved rate of flow, setting a first holding time equal to the expected delay of the packet at the node variable minus the quotient of the length of the packet and the reserved rate of flow,
when the expected delay of the packet at the node variable is less than or equal to the quotient of the length of the packet and the reserved rate of flow, setting the first holding time to zero, and
forwarding the packet, including the expected delay of the packet at the node variable and the slack variable in the header, to the first media access controller for transmission based on the first holding time;
at a second node including
a second antenna,
a second transmitter/receiver in communication with the second antenna, the second transmitter/receiver effective to receive the packet,
a second scheduler in communication with the second transmitter/receiver, and
a second media access controller in communication with the second scheduler,
the second scheduler effective to perform the steps of:
receiving the packet,
setting the remaining delay of flow variable equal to the slack variable multiplied by the expected delay of the packet at the node variable,
setting the expected delay of the packet at the node variable equal to a quotient of the remaining delay of flow variable and the number of remaining hops in the flow of the packet,
setting the slack variable equal to the number of remaining hops in the flow of the packet,
when the expected delay of the packet at the node variable is greater than the quotient of the length of the packet and a reserved rate of flow, setting a second holding time equal to the expected delay of the packet at the node variable minus the quotient of the length of the packet and the reserved rate of flow,
when the expected delay of the packet at the node variable is less than or equal to the quotient of the length of the packet and the reserved rate of flow, setting the second holding time to zero, and
forwarding the packet, including the expected delay of the packet at the node variable and the slack variable in the header, to the media access controller for transmission based on the second holding time.

17. The method as recited in claim 16, wherein:
a first deadline for transmitting the packet is equal to a first arrival time of the packet at the first node plus the first holding time; and
a second deadline for transmitting the packet is equal to a second arrival time of the packet at the second node plus the second holding time.

18. The method as recited in claim 16, wherein:
the first scheduler is further effective to perform the steps of:
classifying the packet and sending the packet to a first queue based on a type of the packet;
forwarding the packet to the first media access controller after the first holding time and based on a first sorting algorithm;
the second scheduler is further effective to perform the steps of:
classifying the packet and sending the packet to a second queue based on the type of the packet; and
forwarding the packet to the second media access controller after the second holding time and based on a second sorting algorithm.

19. The method as recited in claim 18, wherein the first and second sorting algorithms are each one of first in first out, round robin, earliest finish time first, and strict priority.

20. The method as recited in claim 16, where the reserved rate of flow is equal to two times a peak data rate times a sustained data rate divided by the sum of the peak data rate and the sustained data rate.

* * * * *